(12) United States Patent
Seger et al.

(10) Patent No.: US 9,193,108 B2
(45) Date of Patent: Nov. 24, 2015

(54) MEANS OF TRANSPORT FOR CONTAINERS AND METHOD FOR THE TRANSPORT OF CONTAINERS

(75) Inventors: Martin Seger, Neumarkt in der Oberpfalz (DE); Toni Hifinger, Regensburg (DE)

(73) Assignee: KRONES AG, Neutraubling (DE)

( * ) Notice: Subject to any disclaimer, the term of this patent is extended or adjusted under 35 U.S.C. 154(b) by 594 days.

(21) Appl. No.: 13/547,181

(22) Filed: Jul. 12, 2012

(65) Prior Publication Data
US 2013/0015610 A1 Jan. 17, 2013

(30) Foreign Application Priority Data
Jul. 13, 2011 (DE) .......................... 10 2011 079 076

(51) Int. Cl.
| | | |
|---|---|---|
| B29C 49/42 | (2006.01) | |
| B29C 33/20 | (2006.01) | |
| B29C 33/36 | (2006.01) | |
| B29C 49/56 | (2006.01) | |
| B65G 21/22 | (2006.01) | |
| B29C 49/06 | (2006.01) | |
| B29C 49/36 | (2006.01) | |

(52) U.S. Cl.
CPC .............. *B29C 49/421* (2013.01); *B29C 33/202* (2013.01); *B29C 33/36* (2013.01); *B29C 49/4205* (2013.01); *B29C 49/4236* (2013.01); *B29C 49/56* (2013.01); *B65G 21/22* (2013.01); *B29C 49/06* (2013.01); *B29C 49/36* (2013.01)

(58) Field of Classification Search
CPC .............. B29C 49/421; B29C 49/4236; B29C 49/4205; B29C 49/56; B29C 49/36; B29C 33/36; B29C 33/202; B29C 2049/4882; B29C 2049/4879; B65G 21/22
USPC .................................................. 425/538, 540
See application file for complete search history.

(56) References Cited

U.S. PATENT DOCUMENTS

| | | | | | |
|---|---|---|---|---|---|
| 1,842,411 | A | * | 1/1932 | Ladd ......................... | 198/803.16 |
| 3,111,711 | A | * | 11/1963 | Colombo ....................... | 425/532 |
| 3,824,062 | A | * | 7/1974 | Farrell ......................... | 425/451 |
| 3,834,852 | A | * | 9/1974 | Hall ............................. | 425/538 |
| 4,005,966 | A | | 2/1977 | Nutting | |

(Continued)

FOREIGN PATENT DOCUMENTS

| | | | |
|---|---|---|---|
| DE | 1232331 | B * | 1/1967 |
| DE | 20 62 283 | A | 8/1971 |

(Continued)

OTHER PUBLICATIONS

Partial machine translation of DE 3008154 A1 dated Sep. 1981.*

(Continued)

*Primary Examiner* — Robert B Davis
(74) *Attorney, Agent, or Firm* — Leydig, Voit & Mayer, Ltd.

(57) ABSTRACT

A transport system for containers includes a plurality of vehicles configured to be driven independently of each other. A guiding device is configured to guide the vehicles in a circulating manner. A plurality of mold shells are configured to encompass a side wall of the containers about a partial circumferential area of the side wall, the plurality of mold shells being mounted on respective ones of the plurality of vehicles so as to receive the containers between adjacent mold shells of adjacent vehicles and transport them.

13 Claims, 5 Drawing Sheets

(56) References Cited

U.S. PATENT DOCUMENTS

| | | |
|---|---|---|
| 4,967,539 A | 11/1990 | Hansen |
| 6,220,310 B1 | 4/2001 | Emmer |
| 6,820,660 B1 | 11/2004 | Ludwig |
| 2004/0178542 A1 | 9/2004 | Krall et al. |

FOREIGN PATENT DOCUMENTS

| | | | |
|---|---|---|---|
| DE | 3008154 A1 * | 9/1981 | |
| DE | 38 32 566 A1 | 4/1990 | |
| DE | 100 65 591 B4 | 9/2002 | |
| DE | 602 08 936 T3 | 10/2010 | |
| DE | 102012101239 A1 * | 8/2013 | |
| EP | 1 226 017 B1 | 3/2006 | |
| GB | 1341845 A | 12/1973 | |
| WO | 98/51 608 A1 | 11/1998 | |
| WO | 99/47 330 A1 | 9/1999 | |
| WO | 2007/096 042 A1 | 8/2007 | |

OTHER PUBLICATIONS

Partial machine translation of EP 1226017 B1 dated Mar. 2006 (listed as corresponding DE 19948474 in the translation).*
German Patent Office, Search Report in German Patent Application No. 10 2011 079 076.4 (Apr. 4, 2012).

* cited by examiner

MEANS OF TRANSPORT FOR CONTAINERS AND METHOD FOR THE TRANSPORT OF CONTAINERS

CROSS-REFERENCE TO PRIOR APPLICATION

Priority is claimed to German Patent Application No. DE 10 2011 079 076.4, filed on Jul. 13, 2011, the entire disclosure of which is hereby incorporated by reference herein.

FIELD

The invention relates to a transport system for containers, to a method for the transport of containers by the transport system according to the invention, and to a container suited for the transport by the transport system according to the invention.

BACKGROUND

For the transport of containers in filling plants, e.g. in the areas where units for blow-molding the containers, filling the containers and/or closing the containers are located, circulating, particularly rotating means of transport are employed, on each of which usually a holding device for holding a container is provided. The containers, particularly plastic bottles, are usually transported suspended on a bearing ring, with a ground clearance. Therefore, the bearing ring formed in the neck portion of the containers is a prerequisite for the efficient handling in prior filling plants. The bearing ring not only represents a constraint in the design of containers and closures, however, but requires a relatively high material input in the production of the containers.

Hence, there is a need for alternative efficient transport systems in filling plants, which can do without a bearing ring on the containers. Moreover, it would be desirable to use a modular design principle for transport systems in filling plants to a higher degree, so as to improve the flexibility with respect to the various container designs and with respect to the different requirements in individual plant components.

One alternative transport concept can be derived, for example, from blow-molding machines, where the containers are held and transported by the mold halves immediately after the blow-molding. It is known from EP 1226017 B1 to arrange two blow mold halves, which are each arranged oppositely relative to the transport direction of the blowing wheel, on a common mold carrier. By pivoting the blow mold carrier on the blowing wheel an approximately stationary gap can be provided between adjacent mold carriers, so as to introduce preforms between the blow mold halves and remove the molded bottles from the same. To this end, comparatively complicated holding mechanisms to hold the mold carriers on the blowing wheel are necessary, however, such as radially extendable holding arms. Hence, a transport system of this type for use in other plant areas of filling plants is, so far, not available.

Further known are oscillating shuttle systems comprising a plurality of blow molds for the alternate blow-molding of containers in the respective molds, as described, for example, in DE 60208936 T3. Opening and closing the blow molds is possible by a displacement along a rail system. So far, systems of this type are restricted to stationary, i.e. non-rotating handling plants, however.

SUMMARY

In an embodiment, the present invention provides a transport system for containers. A plurality of vehicles are configured to be driven independently of each other. A guiding device is configured to guide the vehicles in a circulating manner. A plurality of mold shells are configured to encompass a side wall of the containers about a partial circumferential area of the side wall, the plurality of mold shells being mounted on respective ones of the plurality of vehicles so as to receive the containers between adjacent mold shells of adjacent vehicles and transport them.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
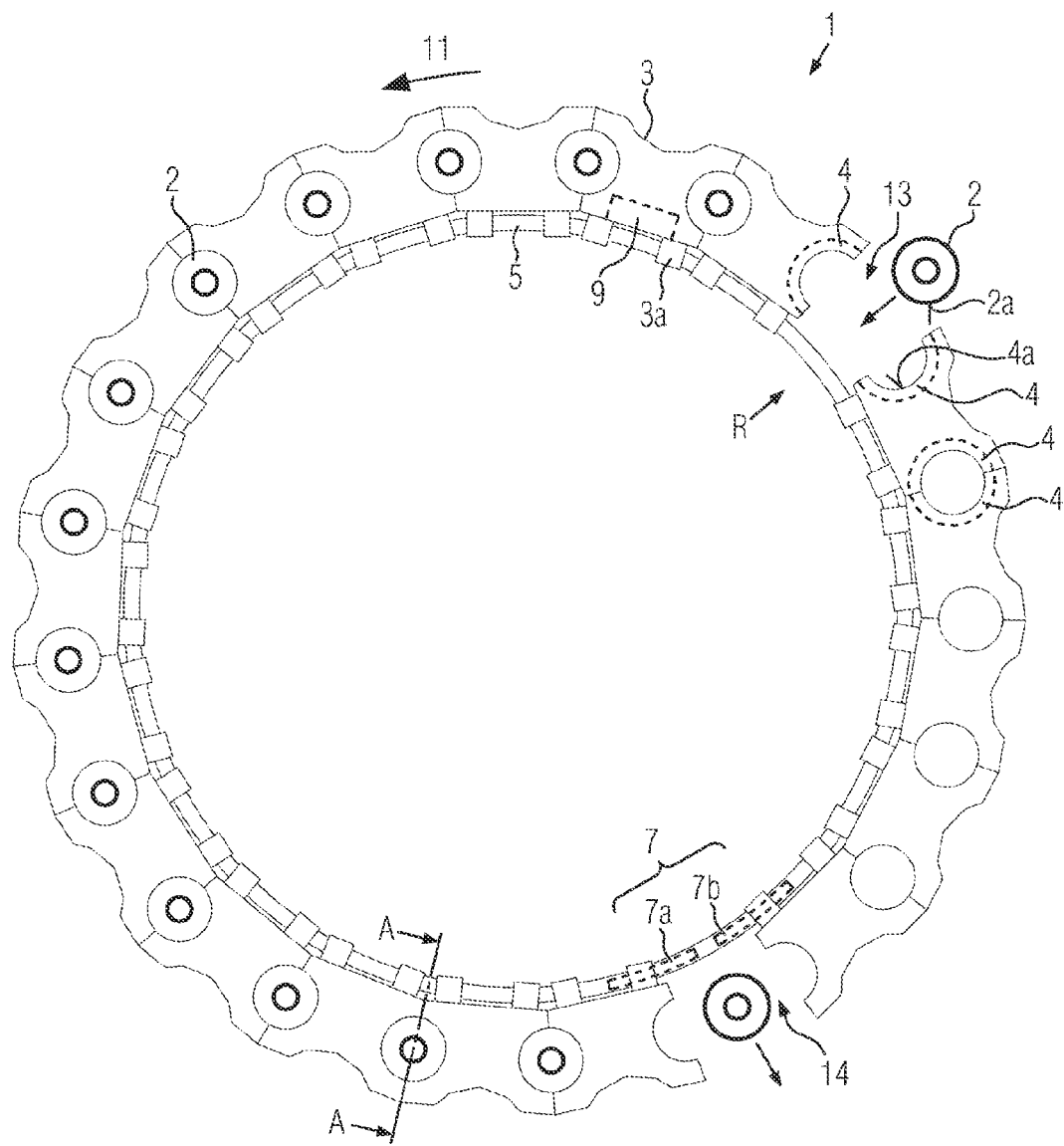
FIG. 1 shows a schematic top view of a first embodiment of the transport system according to an embodiment of the invention.

In an embodiment, the present invention provides an alternative transportation system also for circulating, particularly rotating handling plants, so as to overcome, or at least reduce the above-described technical problems recognized by the present invention.

A transport system according to an embodiment of the present invention comprises vehicles driven independently of each other, particularly slides, a guiding device for the circulating guidance of the vehicles, as well as mold shells for encompassing the containers in an at least substantially partial circumferential area of their side wall. The mold shells are mounted on the vehicles so as to receive the containers between the mold shells of adjacent vehicles and transport them. As the containers are encompassed by the mold shells, holding devices in the neck portion of the containers are dispensable or may be designed in a simplified manner. Accordingly, the neck portion of the containers can be relieved during the transport, so that bearing rings in the neck portion become superfluous or may be produced with a lower material input. In this respect, the driving of the vehicles in a mutually independent manner permits movement patterns for opening and closing the holding devices and for transporting the at least substantially encompassed containers.

The term vehicles refers to transport system, such as slides or carriages, each having an independent transport function, so that they can be separated from adjacent vehicles at least in sections of the transport system. The guiding device comprises, for example, rails, guard rails, guide plates, switches and the like. The mold shells can support the containers from below, particularly in the bottom area thereof. The encompassing of the containers is preferably accomplished by a form-closed engagement on the outer wall of the containers.

Advantageously, the guiding device is longer than the lined up vehicles, so as to form at least one non-circulating, particularly approximately stationary gap between the circulating vehicles for introducing and/or withdrawing the containers. Thus, the containers may be withdrawn from and/or introduced into the transport system in a lateral direction, particularly in a radial direction. Stationary in this context implies that the lined up vehicles are successively separated in the transport direction first, and are then moved together again, within a predefined section of the transport system.

A particularly advantageous embodiment further includes an active driving devices for the vehicles, which is provided on the guiding device and particularly comprises linear motor modules. Thus, the vehicles can be substantially designed as reactive, particularly passive drive components, which simplifies the construction and allows a modular construction of the vehicles, particularly an easy exchange of the plurality of vehicles. Linear motor modules are suited in particular for a section-wise, individually controllable drive of the vehicles. In this case, the vehicles are preferably transferred from one linear motor module to the linear motor module downstream thereof in the transport direction.

Preferably, the vehicles comprise reactive driving devices, particularly permanent magnets, cooperating with the active driving devices. This allows an easier control of the vehicles. Reactive in this context refers to a central control of the transport movement by means of the active driving devices. For example, permanent magnets permit the realization of the vehicles as passive drive components.

In a particularly advantageous embodiment two mold shells are mounted on one vehicle, which are opposed relative to the transport direction of the containers. This allows the transport of a flow of encompassed containers between mold shells that have been moved against each other. This means that adjacent mold shells form a holding device for the containers, which can be easily opened by moving the vehicles apart and can be closed by moving the vehicles together. Thus, particularly simple movement patterns can be realized during the opening and closing.

Preferably, the vehicles can be moved against each other so as to encompass a container there between with two mold shells around the full circumference. Thus, the container can be guided in such a way that a bearing ring on the container and a corresponding holding device on the transport system become dispensable.

Preferably, locking devices are provided on the mold shells so as to secure the encompassed containers against rotating about their main axis. Thus, the container can be held in a predefined rotational position when it is closed, particularly by a screw closure. The locking device can be, for example, an elevation or a recess, engaging into a corresponding recess or elevation of the container. Thus, the locking device is preferably a form-closed one, but could also be a force-closed locking device.

In another preferred embodiment the mold shells are adapted to externally support the encompassed containers against a filling pressure for the purpose of carbonation. Thus, the transport system may be integrated in a filling device for carbonated beverages. Particularly, the containers can be filled and carbonated while they are transported in the mold shells. In this case, the container can be supported by the mold shells having wall sections that are formed as a negative of the container shape. A sufficient number of such contact areas between the container wall and the mold shell prevents an inadmissible deformation of the container during carbonation.

In another preferred embodiment the mold shells are formed as blow mold halves. Thus, the transport system may be integrated in an apparatus for blow-molding and/or stretch blow-molding the containers. The mold shells could, for example, laterally encompass the containers and, for blow-molding the containers, be supplemented with a bottom mold. In this case, a locking device is preferably provided, e.g. with clamps or the like, so as to seal the mold shells against the blowing pressure.

Preferably, the mold shells are adapted to laterally hold the encompassed containers underneath a neck portion of the containers. Thus, a bearing ring on the containers becomes dispensable. Thus, the mouth area of the containers can be produced with a reduced material input. Moreover, containers with differently shaped neck portions, mouth areas and closures are transportable.

According to a method for the transport of the containers using the transport system according to an embodiment of the invention, the method comprises the steps of: encompassing the containers in a partial circumferential area of their side wall with the mold shells; transporting the containers between mold shells of respectively adjacent vehicles; and moving the adjacent vehicles apart so as to remove the containers from the transport system, wherein, in particular, the containers are blow-molded and/or filled and/or closed during the transport.

Preferably, the speed of circulation of the vehicles is varied relative to leading and following vehicles for loading and/or unloading the containers, so as to form a non-circulating gap between the vehicles. Thus, the gap between a first pair of vehicles can be closed and, at the same time, can be opened between an adjacent pair of vehicles.

Preferably, the containers are blow-molded and/or filled and/or closed during the transport. Thus, a flexible transport method for the containers can be provided, which can be integrated in different productions steps of the filling plants.

In a plastic container suited for transportation using the transport device according to an embodiment of the invention, at least a partial circumferential area of the outer wall of the container is formed as a negative of an inner wall area of the mold shells. Thus, the containers can be held in a circumferential side wall area, so that a bearing ring in the neck portion or mouth area of the containers becomes dispensable, which allows the saving of material during the production of the containers.

In a particularly advantageous embodiment of the container the container wall in the total area of the mouth orifice, measured in a direction vertical to the main axis of the container, is not thicker than 2 mm, particularly not thicker than 1 mm. Thus, the container is producible with a particularly small material input. Moreover, the mouth area may be designed for various types of closure.

Preferably, the container according to an embodiment of the invention further comprises a closure welded into the mouth orifice, which is preferably made of the same material as the container, wherein particularly a tear tab or the like is provided on the closure to open the container. Thus, closures can be produced involving a reduced material input and/or improved handling and/or improved material recovery. Particularly, there are additional possibilities with respect to the dimensions and design of closures.

As can be seen in FIG. 1, a first embodiment 1 of the inventive transport system for containers 2, such as plastic bottles, comprises a plurality of individually driven vehicles 3 including mold shells 4 for receiving the containers 2. The vehicles 3 circulate on suitable bearings 3a, moving gear or the like along a guiding device 5, e.g. a rail. Active driving devices 7 are integrated in the guiding device 5 and comprises, for example, lined up linear motor modules which cooperate with reactive, particularly passive driving means 9 provided on the vehicles 3. The active driving devices 7 extend along the full circumference of the guiding device 5. For this purpose, for example, a plurality of linear motor modules are provided on the transport system 1 at suited intervals between each other along the transport direction 11.

For the sake of simplicity, FIG. 1 merely shows two circumferential segments 7a, 7b of the driving means 7, e.g. in the form of adjacent linear motor modules. Also, the reactive driving device 9 is shown merely in one of the illustrated vehicles 3. The active driving devices 7 and the reactive driving devices 9 cooperate to allow a continuous transport of the vehicles 3 along the transport direction 11. Correspondingly, if the active driving devices 7 are constructed in segments, e.g. in the form of individual linear motor modules, it is ensured that the reactive driving devices 9 are transferred from one segment 7a to the next segment 7b.

FIG. 1 further shows that the guiding device 5 is longer than the lined up vehicles 3 along the transport direction 11 to form at least one gap 13, 14 between adjacent vehicles 3, in which the containers 2 can be introduced into and/or withdrawn from the transport system 1. In the example of FIG. 1 a first gap 13, which is substantially stationary with respect to the transport direction 11, is provided for introducing the containers 2, and a second gap 14, which is substantially stationary with respect to the transport direction 11, is provided for withdrawing the containers 2. The gaps 13, 14 are provided by varying the speed of at least one vehicle 3 in the region of the gap 13, 14 with respect to leading vehicles 3 and/or following vehicles 3. For example, a first vehicle 3 could be accelerated in the gap region 13, 14 with respect to a second following vehicle 3 so as to open the gap 13, 14. In order to close the gap 13, 14 after the container 2 has been introduced or withdrawn the second vehicle 3 is accelerated with respect to the leading first vehicle 3 and is docked to the same, so that the container 2 is held between adjacent mold halves 4. In this case, the mold halves 4 preferably encompass the container 2 around the full circumference thereof. Depending on the case of application it is also conceivable, however, that the mold halves 4 encompass only a partial circumferential area of the side wall 2a of the container. Apart from a lateral guidance of the containers an additional holding of the container 2 in a vertical direction is advantageous, as will be explained in more detail below.

To allow opening and closing the transport system 1 in the gap region 13, 14 the vehicles 3 are driven individually and independently of each other. According to an embodiment of the invention this means that the relative position of adjacent vehicles 3 in the transport direction 11 is variable during the ongoing transport, whereby it is advantageous, but not absolutely necessary, that the vehicles 3 are individually exchangeable. The mold shells 4, too, can be exchangeably mounted on the vehicles 3. Thus, it would be possible to design the mold shells 4 as exchangeable set components so that, for example, merely the mold shells would have to be exchanged if the production were changed to another container type. It would also be conceivable, however, to design the vehicles 3 as fast exchangeable ones in order to be capable of exchanging them in the event of a product change and/or breakdown.

As can further be seen in FIG. 1, advantageously two mold halves 4 pointing away from each other are provided on the vehicles 3. Thus, the transport system 1 can be opened and closed in the region of the gaps 13, 14 at the same time by simply displacing one vehicle 3 with respect to the adjacent vehicles 3. It would also be possible, however, to provide an own vehicle 3 for each mold half 4. In this case, the opening and closing of the transport system 1 in the region of the gaps 13, 14 could take place independently in terms of time.

In the first embodiment 1 the guiding device 5 is arranged radially inwardly relative to the curvature of the transport path. This simplifies the introduction and withdrawal of the containers in a lateral, particularly radial direction R toward the outside. Depending on the case of application it would also be possible, however, to dispose the guiding device 5 in a region below or on top of the mold halves 4.

Figure 2:
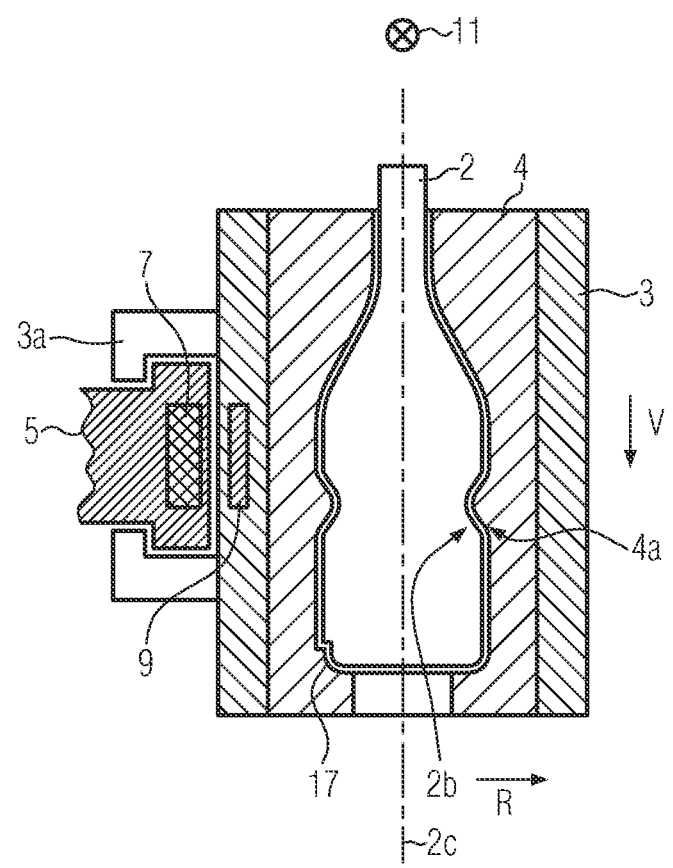
FIG. 2 shows a schematic cross-section through a container held in the transport system according to an embodiment of the invention.

FIG. 2 illustrates in a cross-section along line A-A of FIG. 1 that the mold halves 4 can include an inner holding area 4a which is substantially formed as a negative of the container contour 2b. Thus, the container 2 encompassed by the mold halves 4 can be locked in position in a vertical direction V. Therefore, a bearing ring on the container 2 and a corresponding holding device on the transport system 1 are dispensable.

Preferably, the inner holding area 4a of the mold shells 4 and the outer contour 2b of the containers 2 to be held are matched to each other in such a way that the container 2 is supported against a filling pressure when a beverage to be filled in is carbonated in the container 2. In other words, a dimensional tolerance is maintained between the outer contour 2b of the container 2 and the inner holding area 4a of the mold shells 4, which avoids an inadmissible expansion of the container 2 during the carbonation.

Alternatively or additionally, a locking device 17 may be provided on the mold shells 4, e.g. in the form of a protrusion in the bottom area of one of the corresponding mold shells 4, which engages into a corresponding recess in the container 2 so as to prevent the container 2 from rotating about its main axis 2c relative to the mold shell 4. Thus, the container 2 can be transported and handled in a predefined rotational position, which allows a closing of the container 2 during the transport, particularly by screwing on a screw cap.

Figure 3:
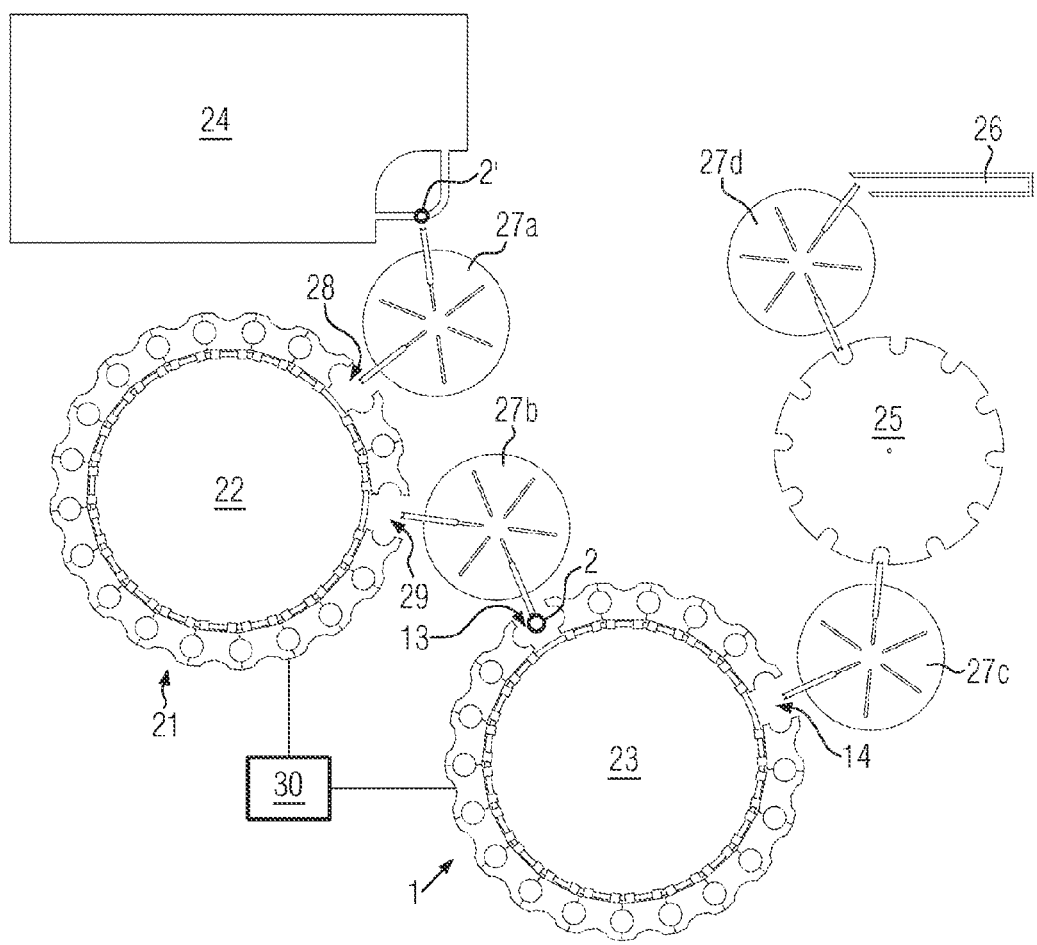
FIG. 3 shows a schematic top view of a filling plant comprising the transport system according to an embodiment of the invention.

FIG. 3 illustrates that the transport system according to an embodiment of the invention may be used for the transport of containers in different handling stations of a filling plant. Thus, according to a second embodiment 21, the transport system according to the invention is provided on a blow-molding station 22 and, according to the first embodiment 1, on a filling station 23. Further shown are a heating module 24 for preforms 2', a closing station 25, a removal device 26 as well as transfer devices 27a-27d for transferring the preforms 2' from the heating module 24 to the blow-molding station 22, and for transferring containers 2 between the other stations.

As can be seen in FIG. 3 the transport system 1, 21 according to embodiments of the invention can be substantially operated according to the same operating principle. For example, a non-circulating gap 28, 13 is provided on the blow-molding station 22 and the filling station 23 for introducing preforms 2' or containers 2, and a non-circulating gap 29, 14 is provided for the withdrawal of the respective containers 2. These approximately stationary gaps 13, 14, 28, 29 may be provided in different partial circumferential areas of the respective transport system 1, 21, however, for example in order to utilize a largest possible machine angle for blow-molding the containers 2 in the blow-molding station 22. It would also be conceivable, of course, to provide an inventive transport system on the closing station 25.

Advantageously, the transfer devices 27a-27d can alternatively be replaced by a continuous transport by the transport system 1, 21 according to embodiments of the invention. This particularly has the advantage that the containers 2 are continuously held and any transfer problems are excluded. To this end, it is required to construct the guiding device 5 with the active driving devices 7 continuously, i.e. from the blow-molding station 22 via the filling station 23 to the closing station 25, provided they are included in the assembly.

As can further be seen in FIG. 3, a control unit 30 is provided to control at least one inventive transport system 1, 21. The control unit 30 serves to coordinate the circulating movements of the individual vehicles 3 to provide in predefined partial circumferential areas or machine angle areas approximately stationary gaps 13, 14, 28, 29 for introducing and withdrawing preforms 2' or containers 2, and to provide transport paths between the gaps 13, 14, 28, 29, in which the containers 2 are encompassed by the mold shells 4 and are thus transported by the vehicles 3 in a circulating manner. During the circulating transport of the containers 2 handling steps can be carried out, e.g. the blow-molding of the containers 2, the filling of the containers 2 and/or the closing of the containers 2. At the gaps 13, 14, 28, 29 the containers 2 and/or the preforms 2' can be transferred by known transfer devices 27a-27d, e.g. transfer star wheels. Thus, the transport system 1, 21 according to embodiments of the invention may be integrated in various production plants for the filling of beverages.

Figure 4A:
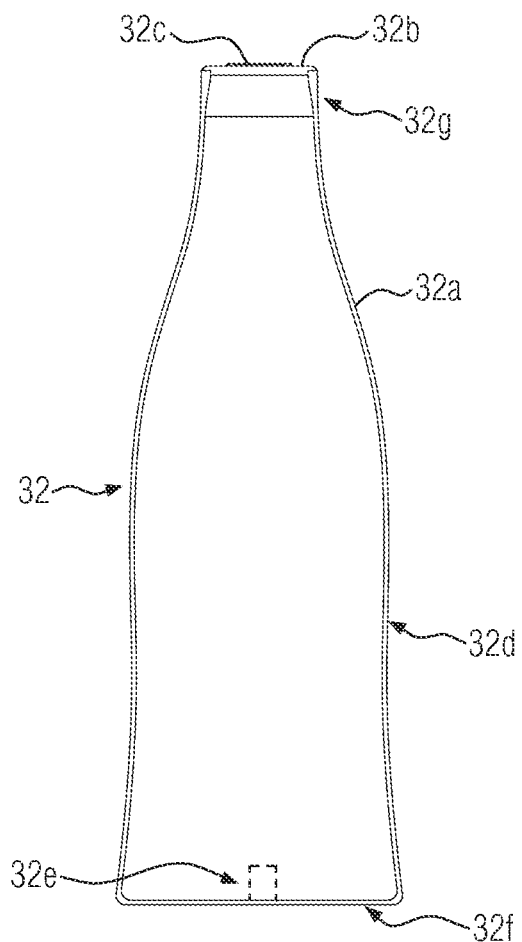
FIG. 4A shows a schematic longitudinal section through a container according to an embodiment of the invention having a closure welded into the same.
Figure 4B:
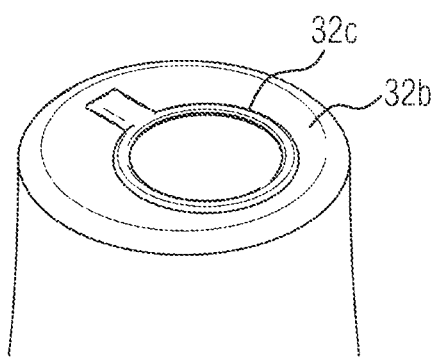
FIG. 4B shows an oblique view of the mouth area of the container of FIG. 4A.

FIGS. 4A and 4B show a preferred embodiment 32 of an inventive container, comprising a basic container body 32a of plastic, e.g. PET, and a closure 32b welded to the basic container body 32a. Preferably, a tear tab 32c is provided on the closure 32b, by means of which the closure 32b or at least a portion of the closure 32b can be torn off so as to open the container 32. FIG. 4a further shows that no bearing ring is provided on the container 32. Also, the screw cap usually required for plastic bottles is dispensable. Preferably, the outer contour 32d of the container 32 corresponds, at least section-wise, to the contour of the inner holding area 4a of the mold halves 4. Also, a locking device 32e may be provided in the region of the outer contour 32d or in the region of the container bottom 32f, preferably in the form of a recess or indentation in the container 32, so as to predefine the rotational position of the container 32. This may be an advantage, for example, for the labeling of the container 32.

Thus, the container 32 according to an embodiment of the invention permits in cooperation with the mold shells 4 guiding and holding the containers 32 in the region of the outer contour 32d as well as locking the rotational position of the containers 32 relative to the mold shells 4 by means of the locking devices 32e, 17. Thus, absolutely no structures for carrying and/or locking the container 32 have to be provided in the mouth area 32g of the container 32. This results in an improved design freedom in the mouth area 32g of the container 32. Particularly, it is possible to save material in the mouth area 32g and in the neck portion of the container 32, and simplify the closure of the container. For example, the welded closure 32b is easy to produce with a small material input. Particularly, the mouth area 32g of the container 32 can be produced with particularly thin walls. Preferably, the wall thickness there is smaller than 2 mm, particularly smaller than 1 mm.

Figure 5:
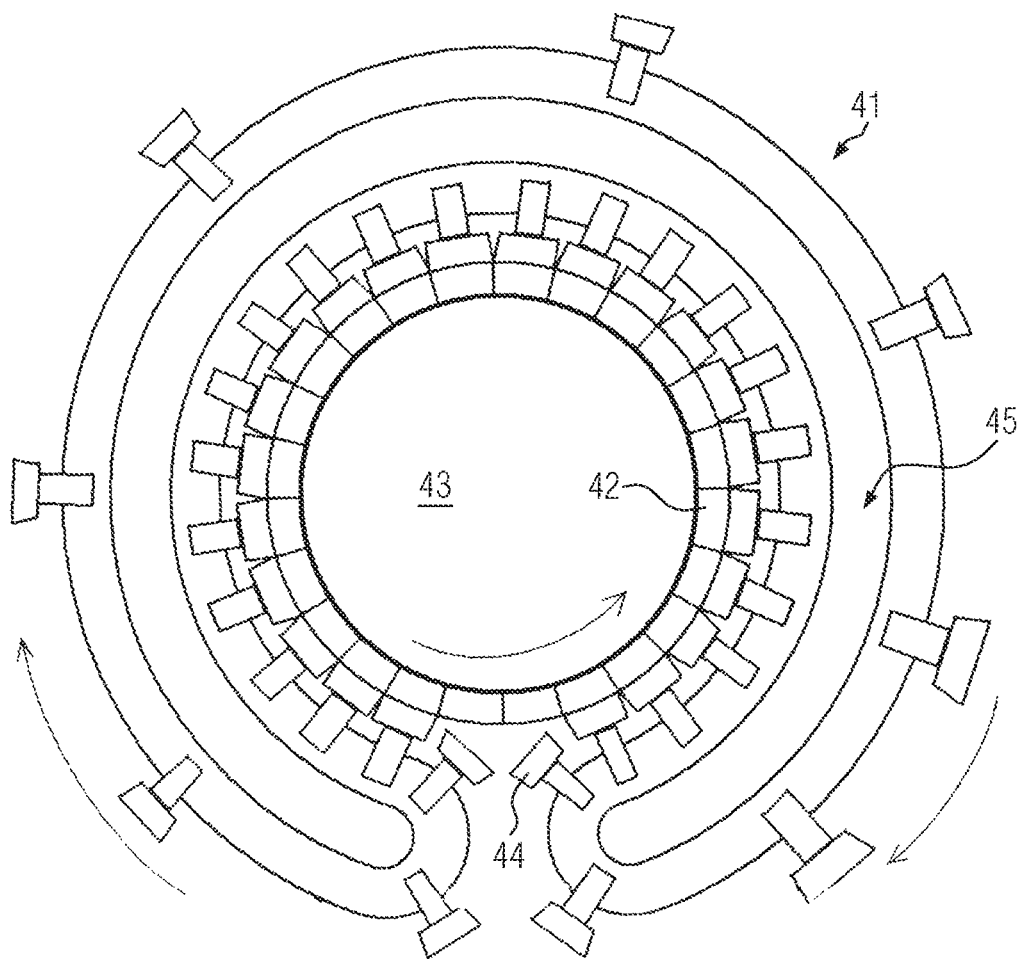
FIG. 5 shows an explanatory comparative example for a transport system, where two separate transport cycles for mold halves are provided.

For the better understanding of the invention a comparative example is shown in FIG. 5, with a transport system 41 where blow mold halves 42 located in a radial inward direction are fixedly mounted on a blowing wheel 43, while blow mold halves 44 located in a radial outward direction are moved in an own transport cycle along a partial circumferential section of the blowing wheel 43 having the radially inwardly provided blow mold halves 42, thereby closing a blow mold with a corresponding inner blow mold half 42. The cycle for the blow mold halves provided in the radial outer direction can, in this case, be realized by a transport system 45, comprising a guiding device having an active driving devices and passively operated vehicles for carrying the outer blow mold halves 44. For example, linear motor modules could be integrated in the guiding means, and permanent magnets in the vehicles for the outer blow mold halves 44. Also, it would be conceivable to drive the radially outwardly provided blow mold halves 44 by a circulating chain or the like. The outer blow mold halves 44 could be latched into the inner blow mold halves 42 in a form-closed manner, so that an additional locking device becomes dispensable. Bottom molds can be docked to the blow mold halves 42, 44 from below in a manner known from the prior art. The bottom mold could be engaged with the blow mold halves by an additional locking mechanism, e.g. a slide. This comparative example illustrates a concept providing a particularly compact blowing wheel which has a particularly large machine angle usable for the blow-molding of containers.

The operating mode of the transport system according to an embodiment of the invention is described by way of an example on the basis of the first embodiment 1, when used in the filling station 23 shown in FIG. 3. Accordingly, containers 2 to be filled are continuously supplied by the transfer device 27b in the region of gap 13 between adjacent mold halves 4. For this purpose, for example, a vehicle 3 is docked in the region of gap 13 to the respective leading vehicle 3 at an increased speed of circulation, so as to open the gap 13. Upon opening the gap 13 a container 2 can be introduced by the transfer device 27b into gap 13. It is also possible that the leading mold half 4 on vehicle 3 moves on temporarily at a reduced transport speed, or is temporarily stationary with respect to gap 13. Preferably, corresponding pivoting devices and/or telescopic devices are provided on the transfer device 27b, however, so as to bring the container 2 into contact with the leading mold shell 4. Upon correctly positioning the container 2 with respect to the leading mold shell 4, the vehicle 3 with the following mold shell 4 can be moved against the container 2. To this end, the speed of circulation of the following mold shell 4 and the associated vehicle 3 is temporarily increased. Consequently, the gap 13 toward the following vehicle 3 is automatically opened, and a container 2 can, again, be introduced into the gap 13. The approximately stationary gap 13 can, thus, travel back and forth in a defined machine angle area relative to the transport direction 11. Therefore, the term stationary is to be understood within the meaning of non-circulating, and defines an area, particularly a machine angle area, which the gap 13 does not leave so as to carry out the movement sequences for opening the transport system 1, for receiving the container 2 between the mold shells 4 and for closing the transport system 1.

Upon closing the gap 13 the respective container 2 is circumferentially transported further between the mold shells 4, so that the respective production step, e.g. filling the bottle, can be carried out during the transport of the container 2. In the area of gap 14, gap 14 is opened in correspondence with the movement scheme described above with respect to gap 13, so as to withdraw the container 2 and transfer it to the transfer device 27c for the further handling thereof.

Gaps 14, 28 and 29 can be made available in the same manner as gap 13 described in detailed length above. It is also possible, however, to supplement the above-described movement sequences of vehicles 3 and mold shells 4 by additional opening movements and/or closing movements, e.g. by lifting and lowering a bottom mold in the area of the blow-molding station 22.

Particularly in order to counteract the increased forces caused by high pressures during the blow-molding process or during the filling with carbonated liquids, the vehicles 3 may be connected to each other. This is accomplished either on the mold shells 4 or the reactive driving devices 9, or the holding devices thereof, respectively, and may be realized by suitable locking mechanisms after the introduction of the containers 2, which may be a simple latching mechanism, a magnetic coupling, a vacuum coupling or any other force-closed or form-closed connection, which is undone again shortly before the mold shells 4 are opened. Particularly, the linear motor modules are thus not exposed to additional forces which occur section-wise.

The embodiments described above can, thus, be supplemented in a technically sensible manner so as to realize additional advantageous embodiments of the invention.

What is claimed is:

1. A transport system for containers comprising:
   a plurality of vehicles configured to be driven independently of each other;
   a guiding device configured to guide the vehicles in a circulating manner;
   a plurality of mold shells configured to encompass a side wall of the containers about a partial circumferential area of the side wall, the plurality of mold shells being mounted on respective ones of the plurality of vehicles so as to receive the containers between adjacent mold shells of adjacent vehicles and transport them; and
   active driving devices for the plurality of vehicles disposed on the guiding device,
   wherein the plurality of vehicles include reactive driving devices cooperating with respective ones of the active driving devices, and
   wherein the active driving devices include linear motor modules cooperating with permanent magnets of the reactive driving devices.

2. The transport system according to claim 1, wherein the containers are plastic bottles and the plurality of vehicles include slides.

3. The transport system according to claim 1, wherein the guiding device is longer than the plurality of vehicles so as to form at least one non-circulating gap between respective ones of the plurality of vehicles for at least one of introducing and withdrawing the containers during the circulating of the plurality of vehicles.

4. The transport system according to claim 1, wherein two of the plurality of mold shells are mounted on each one of the plurality of vehicles, the two of the plurality of mold shells being opposed to each other relative to a transport direction of the containers.

5. The transport system according to claim 1, wherein the plurality of vehicles are configured to be movable against each other so as to encompass a full circumference of a respective one of the containers between two of the plurality mold shells of adjacent ones of the plurality of vehicles.

6. A transport system for containers comprising:
   a plurality of vehicles configured to be driven independently of each other;
   a guiding device configured to guide the vehicles in a circulating manner;
   a plurality of mold shells configured to encompass a side wall of the containers about a partial circumferential area of the side wall, the plurality of mold shells being mounted on respective ones of the plurality of vehicles so as to receive the containers between adjacent mold shells of adjacent vehicles and transport them; and
   a locking device disposed on each of the plurality of mold shells configured to secure the encompassed containers against rotating about their main axis.

7. The transport system according to claim 1, wherein the plurality of mold shells are configured to externally support the encompassed containers against a filling pressure for the purpose of carbonation.

8. The transport system according to claim 1, wherein the plurality of mold shells are each formed as a blow mold half.

9. The transport system according to claim 1, wherein the plurality of mold shells are configured to laterally hold the encompassed containers underneath a neck portion of the containers.

10. A method for the transport of containers using transport system according to claim 1, the method comprising:
    encompassing, by respective ones of the plurality of mold shells, a side wall of the containers about a partial circumferential area of the side wall;
    transporting the encompassed containers between the respective ones of the mold shells disposed on adjacent ones of the plurality of vehicles; and
    moving the adjacent ones of the plurality of vehicles apart so as to remove the containers from the transport system.

11. The method according to claim 10, further comprising at least one of blow molding, filling and closing the containers during the transporting.

12. The method according to claim 10, wherein the transporting is performed with a speed of circulation of the plurality of vehicles that is varied relative to leading and following ones of the plurality of vehicles so as to form a non-circulating gap between respective ones of the plurality vehicles into which the containers are at least one of loaded and unloaded.

13. A method for the transport of containers using the transport system according to claim 6, the method comprising:
    encompassing, by respective ones of the plurality of mold shells, a side wall of the containers about a partial circumferential area of the side wall;
    transporting the encompassed containers between the respective ones of the mold shells disposed on adjacent ones of the plurality of vehicles; and
    moving the adjacent ones of the plurality of vehicles apart so as to remove the containers from the transport system.

* * * * *